United States Patent [19]

Williams

[11] 4,286,287
[45] Aug. 25, 1981

[54] IRRADIATION SPECIMEN INSTALLATION APPARATUS WITH TELEVISION INSPECTION

[75] Inventor: Charles F. Williams, Swartz Creek, Mich.

[73] Assignee: Westinghouse Electric Corp., Pittsburgh, Pa.

[21] Appl. No.: 112,365

[22] Filed: Jan. 15, 1980

[51] Int. Cl.³ .............................................. H04N 7/18
[52] U.S. Cl. ................................. 358/100; 176/19 R; 176/30
[58] Field of Search .................... 358/99, 100, 210; 414/146; 176/19 R, 30

[56] References Cited

U.S. PATENT DOCUMENTS

| | | | |
|---|---|---|---|
| 3,036,966 | 5/1962 | Flem et al. | 176/30 |
| 3,066,969 | 12/1962 | Gamac | 358/100 |
| 3,077,361 | 2/1963 | Tait et al. | 358/100 |
| 3,114,799 | 12/1963 | Waters et al. | 358/100 |
| 3,145,636 | 8/1964 | Hall et al. | 358/100 |
| 3,199,613 | 8/1965 | Malott et al. | 358/100 |
| 3,664,922 | 5/1972 | Diwinsky et al. | 176/19 R |
| 3,764,736 | 10/1973 | Kosky et al. | 358/100 |
| 4,124,442 | 11/1978 | Zhuchkov et al. | 176/19 R |

FOREIGN PATENT DOCUMENTS 1058851 4/1964 United Kingdom ................. 358/100

OTHER PUBLICATIONS

Miniature Underwater TV Camera for Nuclear Reactor Insp.-Westinghouse Tech Data 86-553T-Apr. 1977.

Primary Examiner—Joseph A. Orsino, Jr.
Attorney, Agent, or Firm—L. A. DePaul; Z. L. Dermer

[57] ABSTRACT

The irradiation specimen installation apparatus comprises a gripper mechanism capable of being disposed through a hole in the nuclear reactor core barrel flange and capable of gripping the irradiation specimen. The apparatus is also capable of transporting the irradiation specimen so that the irradiation specimen can be deposited in the specimen container. The apparatus also comprises a visual verification mechanism for positively determining if the irradiation specimen has been properly located in the specimen container. A second instrument may be used in conjunction with this apparatus for seating the irradiation specimen in the specimen container once visual verification of its location has been made.

5 Claims, 17 Drawing Figures

IRRADIATION SPECIMEN INSTALLATION APPARATUS WITH TELEVISION INSPECTION

BACKGROUND OF THE INVENTION

This invention relates to irradiation specimen installation apparatus and more particularly to irradiation specimen installation apparatus including visual verification instrumentation.

In typical nuclear reactor power plant systems, the systems include a reactor vessel with a removable closure head mounted thereon. A plurality of fuel assemblies are disposed within the reactor vessel to form the reactor core so as to generate heat produced by the fissioning of the nuclear fuel. A coolant, such as water, is circulated through the reactor core which heats the coolant. The coolant flows through the remainder of the nuclear reactor system so as to produce steam in a manner generally understood in the art.

The fissioning of the nuclear fuel in the nuclear reactor core, not only exposes the fuel in the core to the radiation, but also exposes the internal structures of the nuclear reactor and the reactor vessel to the radiation generated by the core. The reactor vessel and internal support structures are designed for an extended lifetime, for example, 40 years. Over the course of this lifetime, these support structures and reactor vessel are exposed to a considerable amount of radiation. Therefore, it is important to be able to determine the radiation exposure of the various components of the nuclear reactor so that the life expectancy of the various components can be determined. Since the radiation flux from the nuclear reactor may vary with location in the core and vary along the circumference of the core, readings must be taken at various locations with respect to the core in order to have an accurate determination of the radiation exposure of the various components of the nuclear reactor.

In some nuclear reactors, radiation specimen containers are provided at various locations around the periphery of the core so as to provide locations wherein radiation specimens may be held. The radiation specimen disposed in the specimen container is thereby exposed to the radiation flux from the core at various locations around the core. During refueling of the nuclear reactor, the reactor closure head and various components of the upper internals of the reactor can be removed so as to expose the specimen containers. In this manner, radiation specimens can be removed or inserted in the specimen containers. When a radiation specimen is removed from the specimen container during the refueling process, the radiation specimen may then be examined to determine the radiation flux that that portion of the reactor vessel has experienced. At this time, the radiation specimens may also be rearranged so that the radiation specimens can be exposed to various levels of radiation at various locations around the core. In addition to determining the radiation exposure of the various components of the nuclear reactor, the radiation specimens can also be used to expose various elements to the radiation of the nuclear reactor. This can be done for test purposes such as determining the behavior of a particular kind of metal in the reactor environment.

In certain types of nuclear reactors, it is not possible for working personnel to view the specimen container from the top of the reactor vessel during the refueling process. In this type of reactor, the process of inserting the radiation specimen in the specimen container can be a difficult process due to the lack of visual verification of the insertion of the radiation specimen in the specimen container. This is important because should the radiation specimen be released when the radiation specimen is not in the specimen container, the radiation specimen may fall into the lower part of the reactor. Retrieval of a loose radiation specimen from the bottom of the reactor vessel is a difficult and expensive operation because most of the reactor internals including the core must be removed in order to access the loose irradiation specimen. Therefore, it is important to be able to positively place the irradiation specimen in the specimen container and to verify the placement of the radiation specimen before the specimen is released by the instrumentation. In this manner, the radiation specimen may be placed in the specimen container without the possibility of dropping the radiation specimen into the reactor vessel.

There now exist in the prior art numerous kinds of instrumentation for removing and inserting the radiation specimen with respect to the specimen container. For example, one such instrument is similar to the one described herein, however, that instrument does not have the capability of visually verifying that the radiation specimen has been positively inserted in the specimen container.

In addition to apparatus for installing and removing radiation specimens from specimen containers, separate apparatus exists for visually inspecting various components of the nuclear reactor. For example, U. S. Pat. No. 3,764,736 to Kosky et al. describes a remote visual examination apparatus for viewing reactor internals having a television camera with a self-contained lighting system that is capable of being placed in openings in the reactor core barrel flange for examining reactor internals. However, the Kosky et al device along with other apparatus generally known in the art, are not capable of being used together with installation and removal apparatus for radiation specimens in certain situations wherein accessibility of the specimen container is extremely limited.

Therefore, what is needed is irradiation specimen installation apparatus that is capable of installing or removing a radiation specimen from a specimen container and visually verifying the location of the radiation specimen in situations wherein accessibility to the specimen container is extremely limited.

SUMMARY OF THE INVENTION

The irradiation specimen installation apparatus comprises a gripper mechanism capable of being disposed through a hole in the nuclear reactor core barrel flange and capable of gripping the irradiation specimen. The apparatus is also capable of transporting the irradiation specimen so that the irradiation specimen can be deposited in the specimen container. The apparatus also comprises a visual verification mechanism for positively determining if the irradiation specimen has been properly located in the specimen container. A second instrument may be used in conjunction with this apparatus for seating the irradiation specimen in the specimen container once visual verification of its location has been made.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENT

When installing an irradiation specimen within the specimen container of the nuclear reactor, it is necessary to be able to visually determine that the irradiation specimen has been properly located in the specimen container prior to releasing the irradiation specimen. The invention described herein provides a mechanism for inserting an irradiation specimen in the specimen container while visually determining that the irradiation specimen has been properly introduced into the specimen container.

Figure 1:
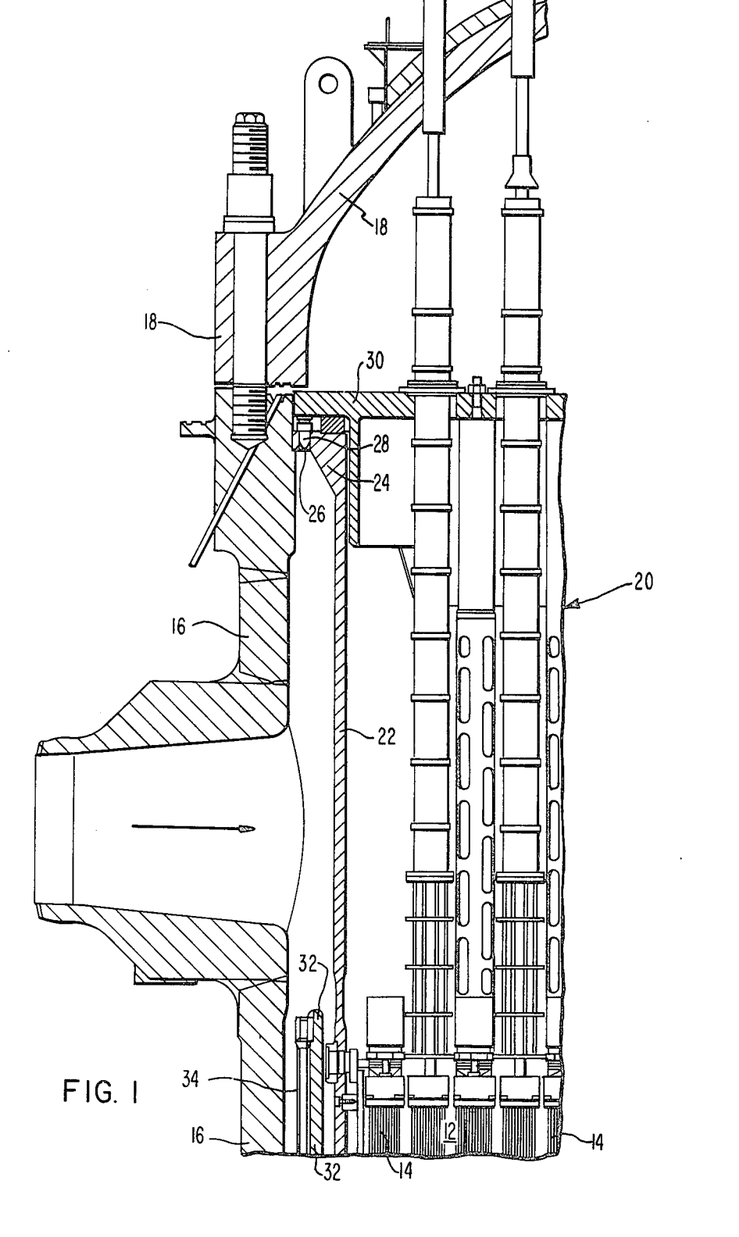
FIG. 1 is a partial cross-sectional view in elevation of a typical nuclear reactor.

Referring to FIG. 1, a nuclear reactor generally referred to as 10 contains a core 12 which comprises nuclear fuel assemblies 14. Fuel assemblies 14 are disposed within reactor vessel 16 which has a removable closure head 18 attached thereto. Nuclear reactor 10 also comprises upper internals 20 with a vertical baffle 22 which may be a cylindrical metal member disposed therearound. Vertical baffle 22 has a baffle flange 24 on the top end thereof and a specimen port 26 disposed in baffle flange 24. A pin 28 is removably disposed in specimen port 26. An upper plate 30 extends over and rests upon baffle flange 24 and pin 28. A core barrel 32 which may be a cylindrical metal member is disposed around core 12. A plurality of specimen containers 34 are disposed at various locations around core 12 and attached to core barrel 32.

During refueling of nuclear reactor 10, closure head 18, upper plate 30, and pin 28 are removed all in a manner well understood in the art. With these members removed, a clear line of access is created from the top of the reactor vessel 16 through specimen port 26 and down to specimen container 34. It is at this time that a irradiation specimen can be inserted into or removed from specimen container 34.

Figure 2:
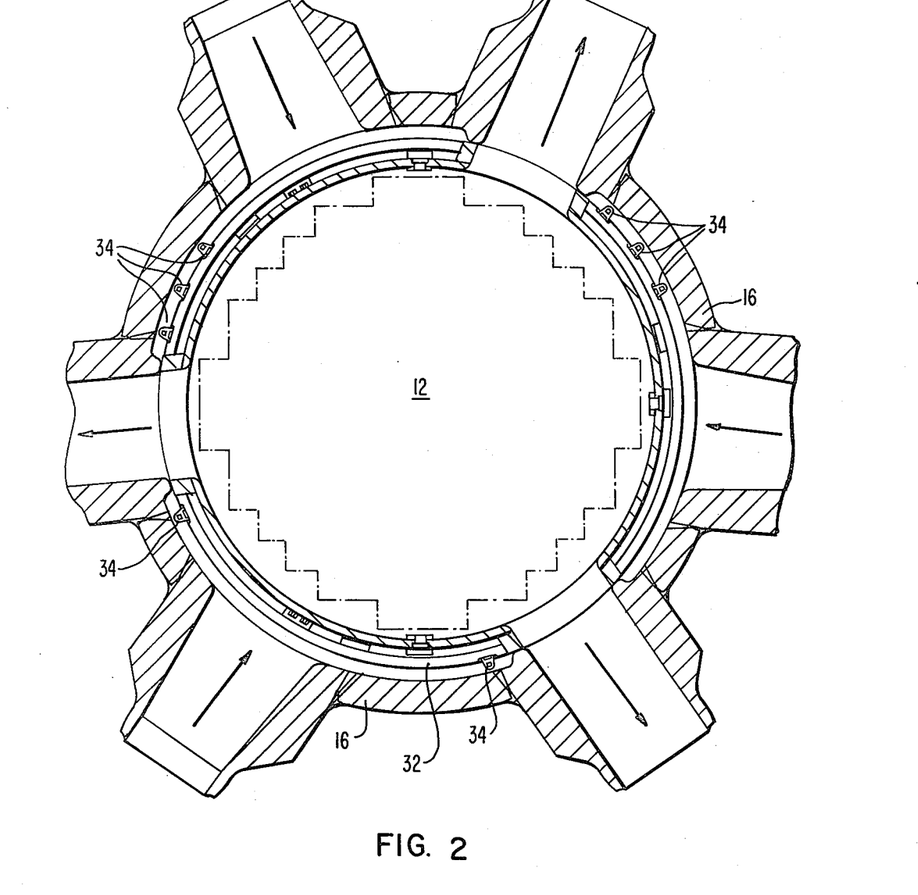
FIG. 2 is a cross-sectional view of a typical nuclear reactor.

As can be seen in FIG. 2, where a plurality of specimen containers 34 are arranged in close proximity to each other, it is possible to insert installation apparatus through a corresponding specimen port 26 and near the corresponding specimen container 34. In the meantime, it is also possible to extend visual examination apparatus through the nearby corresponding specimen port 26 and corresponding specimen container 34 in order to view the adjacent specimen container 34 to insure that the irradiation specimen is properly located therein. However, as is evident from FIG. 2, there are locations around core 12 where a single specimen container 34 is located. When inserting an irradiation specimen into these isolated specimen containers 34, it is not possible to insert separate visual examining apparatus through the particular specimen port 26 so as to view the insertion of the irradiation specimen. Therefore, when inserting an irradiation specimen into these particular isolated specimen containers 34, it is necessary that the installation apparatus include visual examining means for positively determining that the irradiation specimen has been properly located within specimen container 34. The invention described herein provides apparatus that is capable of installing an irradiation specimen in all the specimen containers 34 whether or not there are adjacent specimen containers while being able to positively determine if the irradiation specimen is properly located within the specimen container 34 before releasing the irradiation specimen.

Figure 3A:
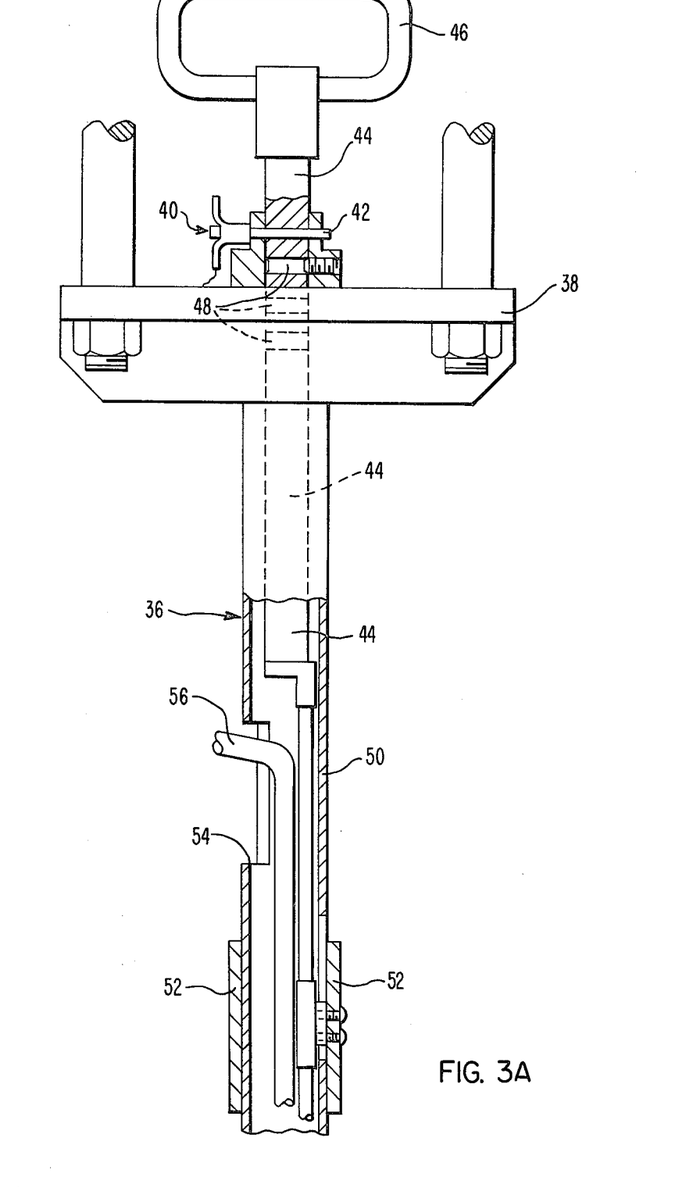
FIGS. 3A through FIGS. 3D are a partial cross-sectional view in elevation of the installation apparatus.
Figure 3B:
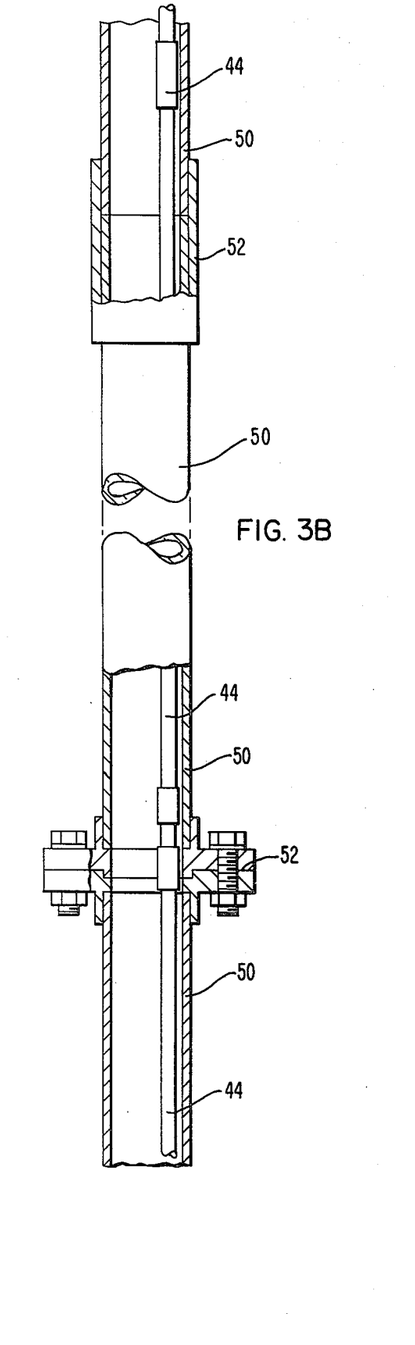
Figure 3C:
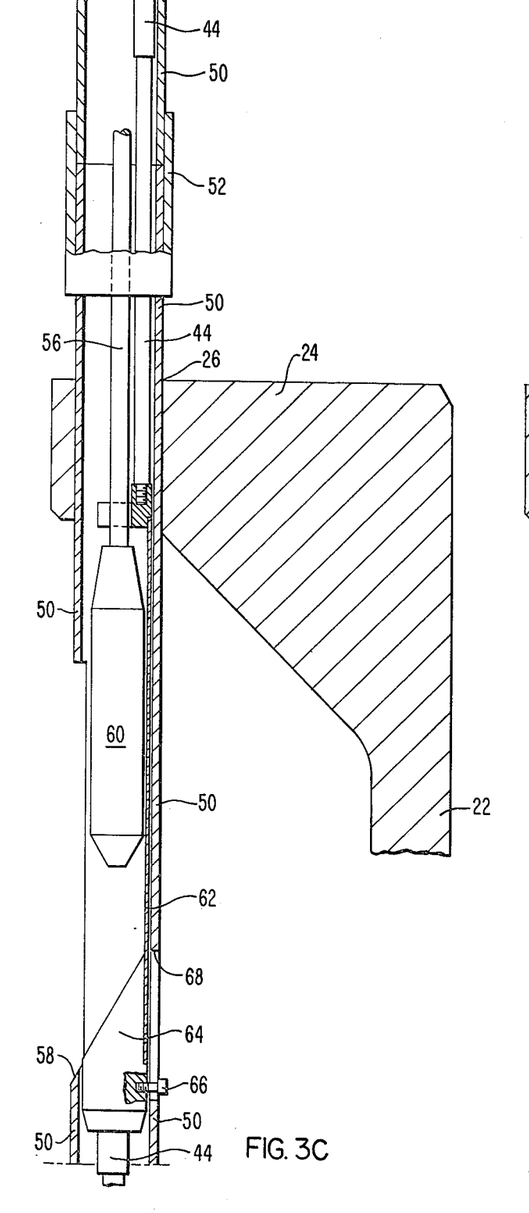
Figure 4:
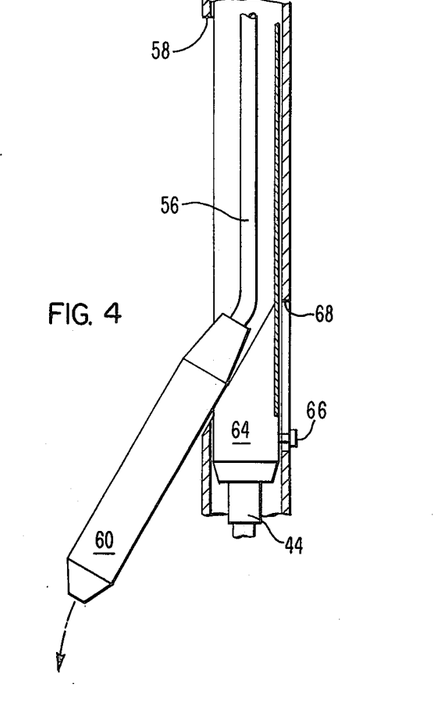
FIG. 4 is a cross-sectional view in elevation of the installation apparatus showing the camera being extended.
Figure 5:
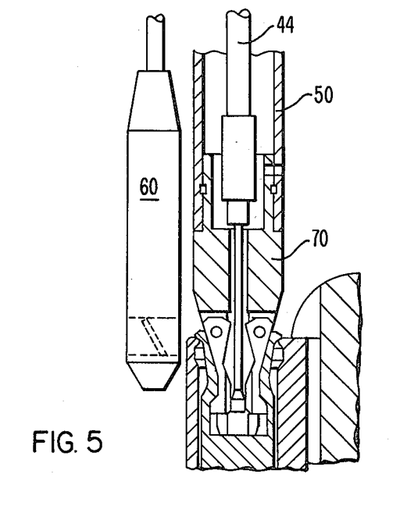
FIG. 5 is a cross-sectional view in elevation of the apparatus with the camera fully extended.
Figure 6:
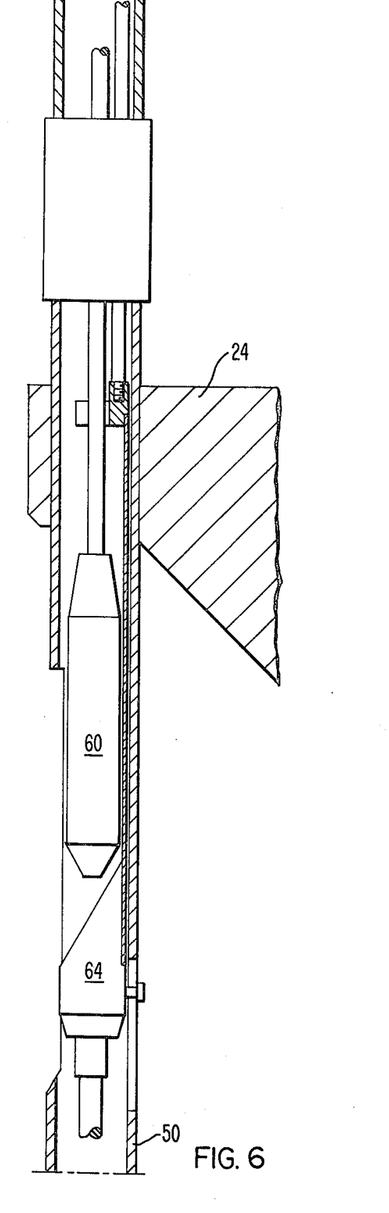
FIG. 6 is a cross-sectional view in elevation of the installation apparatus.

Referring now to FIGS. 3A-3D, the installation apparatus is referred to generally as 36 and comprises a mounting plate 38 with a locking mechanism 40 attached thereto. Locking mechanism 40 may comprise a locking pin 42 which is capable of being disposed through central rod 44. Central rod 44 extends through mounting plate 38 and has a handle 46 attached to the top end thereof. Central rod 44 also has a plurality of holes 48 disposed therein through which locking pin 42 may be positioned to maintain central rod 44 at various elevations with respect to mounting plate 38. Installation apparatus 36 also comprises a tubular member 50 attached to mounting plate 38 through which is disposed central rod 44. Tubular member 50 may be a series of tubular members joined together by mechanical couplings 52. Near the upper end of the tubular member 50 there is provided a first opening 54 through which a television camera cable 56 may be disposed. Near the lower end thereof tubular member 50 has a second opening 58 therein through which a television camera 60 may pass. Camera 60 which may be a Westinghouse ETV-1250 is capable of being fully disposed within tubular member 50 as shown in FIG. 3C. Camera 60 is attached to cable 56 and is capable of being moved into and out of tubular member 50 by means of extending or withdrawing cable 56 through first opening 54 as shown in FIGS. 4 and 5. Cable 56 is also attached to television viewing equipment so that working personnel may remotely view what the camera views. Central rod 44 has a section thereof wherein a thin member 62 is disposed as shown in FIG. 3C. Thin member 62 serves to connect the first portion of central rod 44 to the remaining section of central rod 44. Attached to thin member 62 at its lower end is a diverting mechanism 64 which serves to divert camera 60 out through second opening 58 when camera 60 is lowered by means of cable 56. Thin member 62 provides the capability of connecting the two portions of central rod 44 while allowing camera 60 to be disposed within tubular member 50. Diverting mechanism 64 has a bolt 66 attached therethrough which extends through first slot 68 in tubular member 50. Bolt 66 serves to limit the travel of central rod 44 so that when central rod 44 is at its lowermost location diverting mechanism 64 is in alignment with second opening 58 as shown in FIG. 3C. The locations of diverting mechanism 64 are arranged to correspond with the holes 48 in the top portion of central rod 44 so that locking mechanism 40 may be used to lock central member 44 and diverting mechanism 64 in a selected configuration.

Figure 3D:
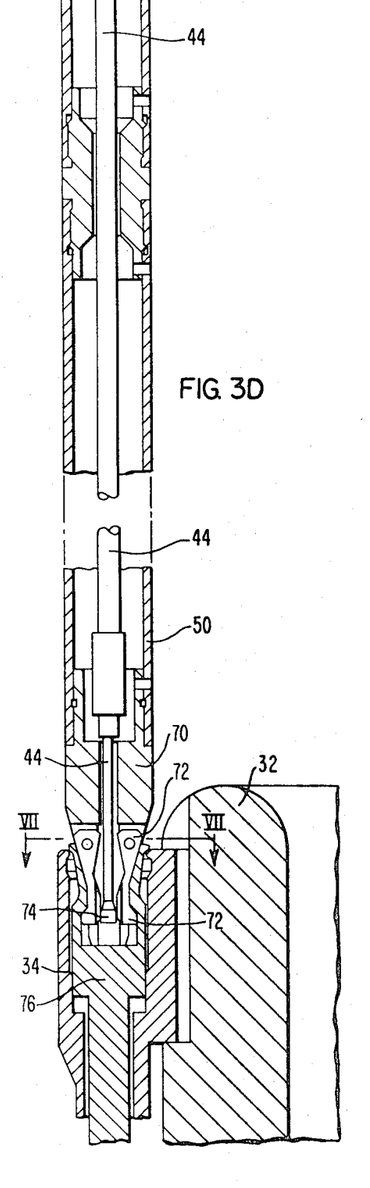
Figure 7:
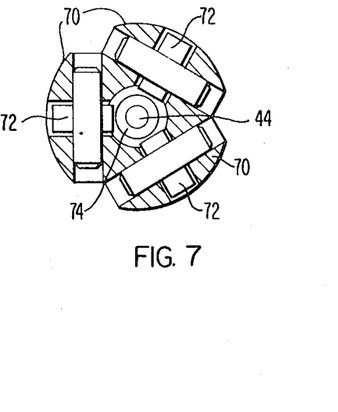
FIG. 7 is a view along line VII-VII of FIG. 3D.
Figure 8:
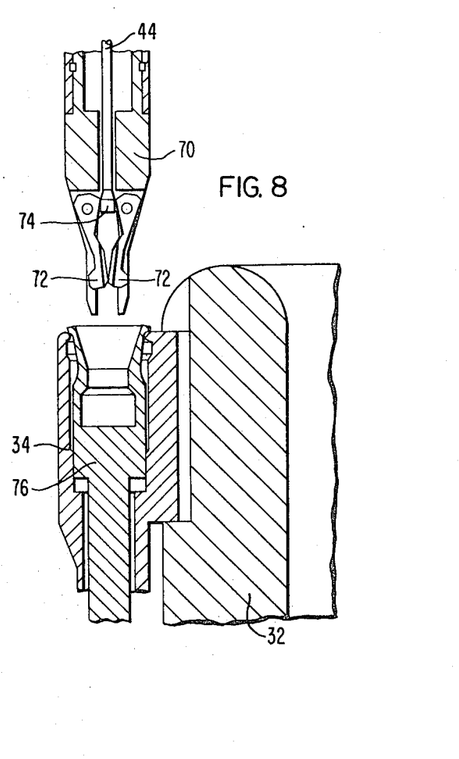
FIG. 8 is a cross-sectional view in elevation of the installation apparatus being withdrawn from the irradiation specimen.

Referring now to FIGS. 3D and 7, an end cap 70 is attached to the lower end of tubular member 50 such that central member 44 is disposed therethrough. End cap 70 has a plurality of first grippers 72 pivotally attached thereto. Central rod 44 also has a block 74 attached to its lower end. When central rod 44 is lowered into the position wherein diverting mechanism 64 is at its lowermost location then block 74 is at its lowermost location also. With block 74 at its lowermost location, block 74 forces first grippers 72 to pivot into contact with the inside ledge of irradiation specimen 76 as shown in FIG. 3D. On the other hand, when central rod 44 is raised, block 74 causes first grippers 72 to pivot in an opposite direction so as to release the irradiation specimen 76 from first grippers 72 as shown in FIG. 8. In this manner, the raising and lowering of central rod 44 can cause first grippers 72 to either contact and hold irradiation specimen 76 or to release irradiation specimen 76.

Figure 9A:
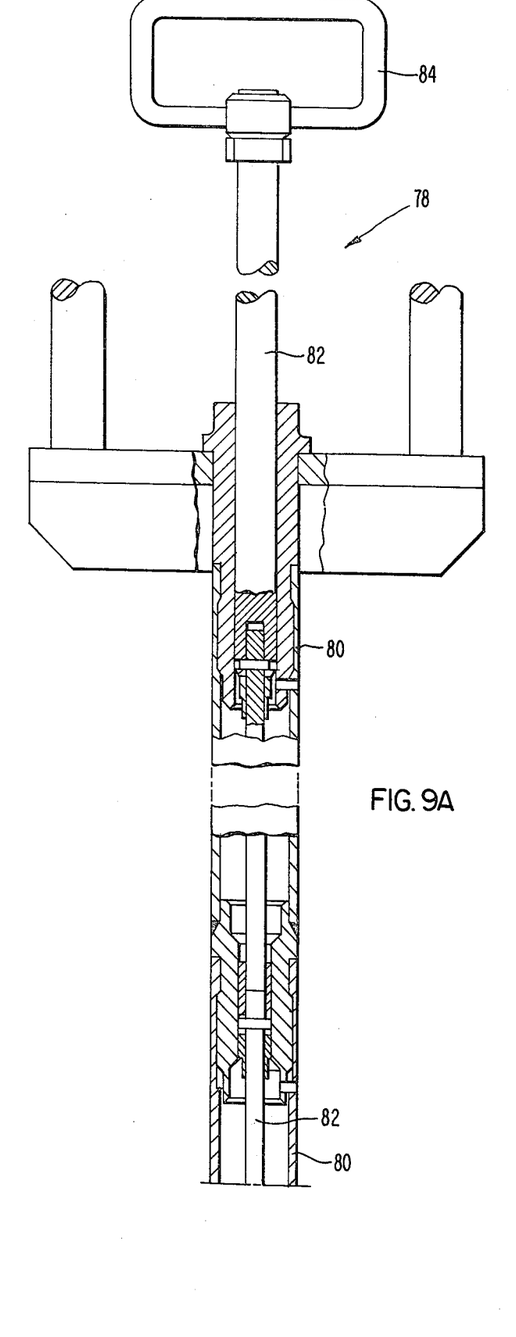
FIGS. 9A-9D are cross-sectional views in elevation of the seating apparatus.
Figure 9B:
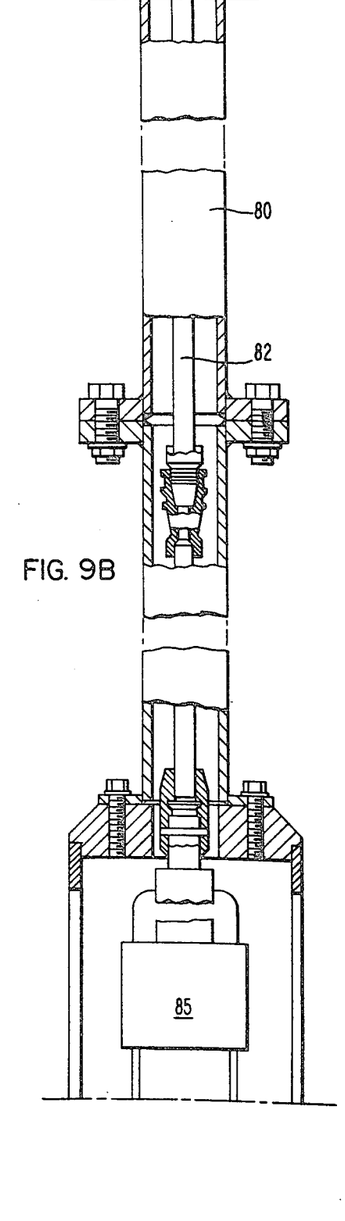
Figure 9C:
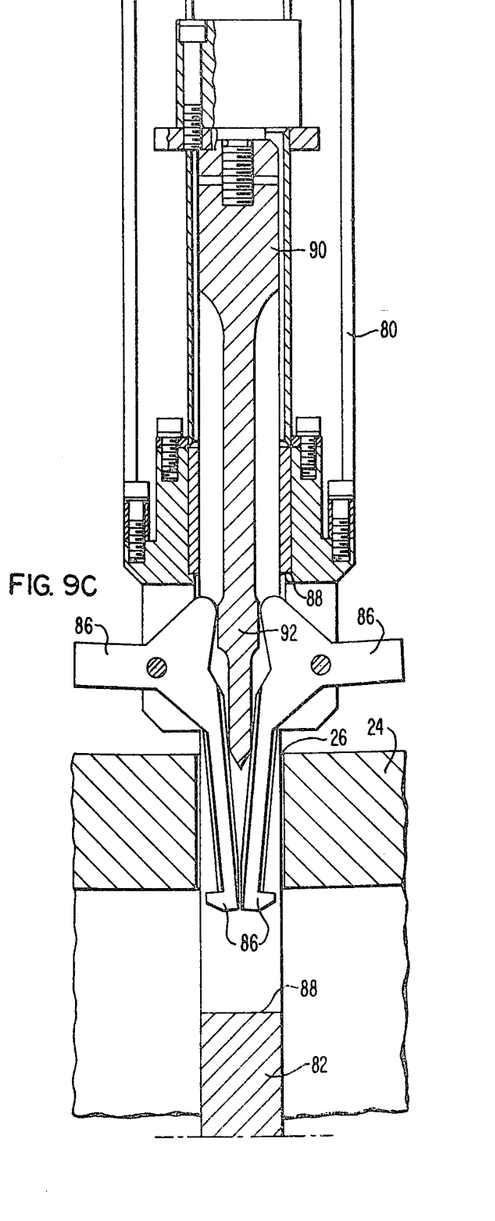
Figure 10:
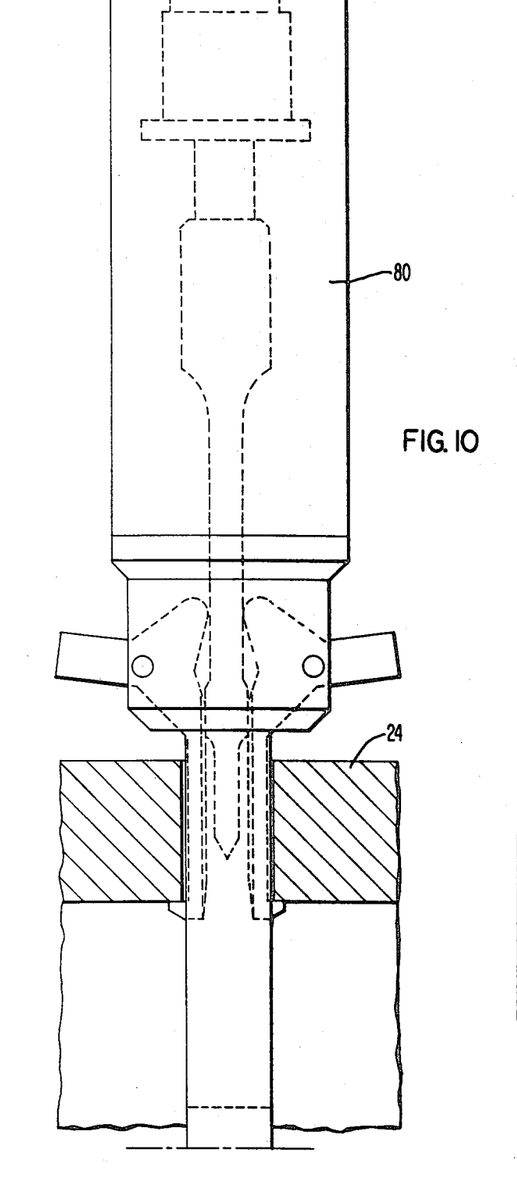
FIG. 10 is a view in elevation of the seating apparatus.
Figure 11:
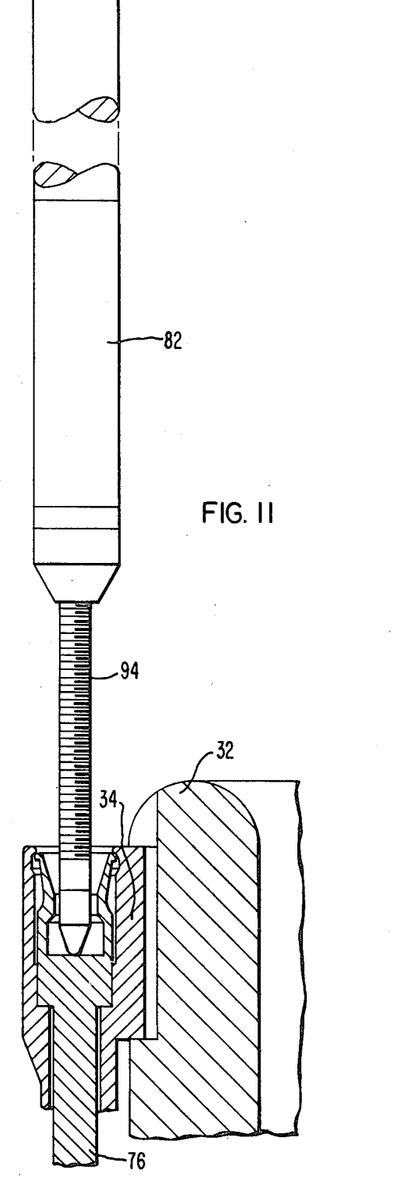
FIG. 11 is a view in elevation of the seating apparatus with the irradiation specimen in the seated position.

Referring now to FIGS. 9A through 9D, the seating apparatus is referred to generally as 78 and comprises an outer housing 80 capable of being disposed through specimen port 26 and capable of being extended to near specimen container 34. An inner rod 82 is slidably disposed within outer housing 80 and has a handle 84 attached to the top end thereof. Outer housing 80 has second grippers 86 pivotally attached thereto and extending through a second slot 88 in inner rod 82 as shown in FIG. 9C. Second grippers 86 are arranged so they can extend through specimen port 26 at a 90° angle with respect to the view shown in FIG. 1. A cam actuator 90 is attached to inner rod 82 and disposed within second slot 88. Cam actuator 90 has a camming surface 92 disposed thereon which causes second grippers 86 to pivot about their attachment to outer housing 80. When handle 84 is moved downwardly, such as under the action of energizing cylinder 85, inner rod 82 is also moved downwardly relative to outer housing 80. As inner rod 82 is moved downwardly cam actuator 90 is also moved downwardly such that camming surface 92 causes second grippers 86 to engage baffle flange 24 as shown in FIG. 10. Attached to the lowermost end of inner rod 82 is a seating pin 94. When inner rod 82 is moved downwardly as previously described, seating pin 94 contacts irradiation specimen 76 and causes irradiation specimen 76 to become seated in specimen container 34 as shown in FIG. 11. Once irradiation specimen 76 has thus been seated, handle 84 can be raised which causes inner rod 82 to be raised. The raising of inner rod 82 causes camming surface 92 to be raised into a position as shown in FIG. 9C. When in the position as shown in FIG. 9C, second grippers 86 are pivoted into a position such that they can be removed from specimen port 26.

OPERATION

During refueling of the nuclear reactor, closure head 18 is unbolted and removed. With closure head 18 removed, upper plate 30 and pin 28 can be removed. When in this configuration, a passageway exists from the top of the reactor through specimen port 26 and down to specimen container 34. At this point, an irradiation specimen 76 may be removed from specimen container 34 or introduced into specimen container 34. When it is desired to insert an irradiation specimen 76 into specimen container 34, an installation apparatus 36 is arranged near the irradiation specimen 76 such that first grippers 72 are disposed within the upper portion of irradiation specimen 76. Next, first handle 46 is moved downwardly such that central rod 44 is moved downwardly which causes block 74 to pivot first grippers 72 into contact with irradiation specimen 76. In this manner, irradiation specimen 76 is firmly gripped by installation apparatus 36. In this configuration installation apparatus with irradiation specimen 76 coupled thereto is inserted through specimen port 26 such that irradiation specimen 76 is disposed in specimen container 34 as shown in FIG. 3D. At this point, cable 56 is either manually or automatically lowered such that camera 60 is lowered by gravity and contacts diverting mechanism 64 as shown in FIG. 4. Diverting mechanism 64 causes camera 60 to slide out of tubular member 50 and into a position as shown in FIG. 5. When in the position as shown in FIG. 5, it is possible for operators located outside of the reactor to determine if irradiation specimen 76 is properly located in specimen container 34. If irradiation specimen 76 is so properly located, cable 56 is then withdrawn which causes camera 60 to be moved upwardly into a configuration as shown in FIG. 3C. Next, first handle 45 is raised which causes central rod 44 and block 74 to be raised such that first grippers 72 release irradiation specimen 76 with irradiation specimen 76 being held by specimen container 34. With first grippers 72 thus released from irradiation specimen 76, installation apparatus 36 may be moved upwardly into a position as shown in FIG. 8. Thus, installation apparatus 36 may be removed from the reactor vessel. At this point, irradiation specimen 76 is located in specimen container 36 but it is not seated firmly therein.

Figure 9D:
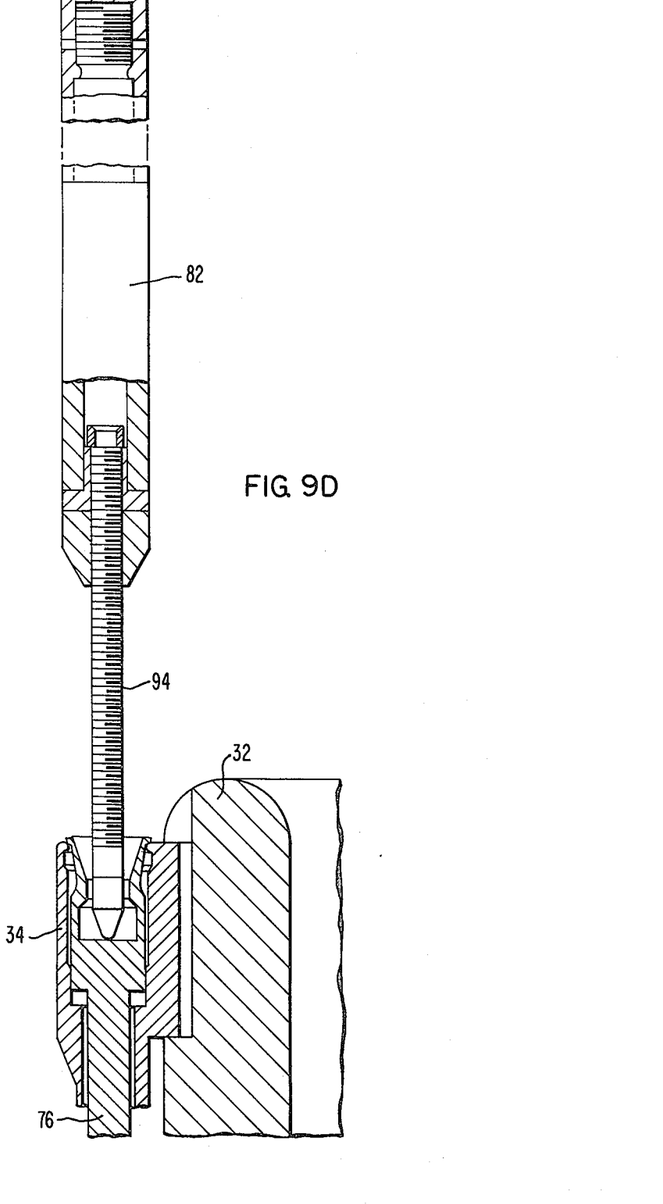

With irradiation specimen 76 loosely seated in specimen container 34, seating apparatus 78 is introduced through specimen port 26 such that seating pin 94 is in contact with irradiation specimen 76 as shown in FIG. 9D. Next, seating apparatus 78 is actuated by moving handle 84 downwardly which causes inner rod 82 to be moved downwardly also. When inner rod 82 is thus moved downwardly, cam actuator 90 is moved downwarldy which causes camming surface 92 to contact second grippers 86 and move them into a position as shown in FIG. 10. Simultaneously, seating pin 94 is moved downwardly and causes irradiation specimen 76 to become firmly seated in specimen container 34 as shown in FIG. 11. Since a significant force is required to seat irradiation specimen 76, second grippers 86 provide a mechanism to accept the reaction force of seating pin 94 onto baffle flange 24. Thus, a sufficient force may be applied to irradiation specimen 76 to seat it in specimen container 34. Therefore, the invention provides irradiation specimen installation apparatus capable of inserting an irradiation specimen in a specimen container in a nuclear reactor while providing the capability of visually confirming that the irradiation specimen has been located in the specimen container before the irradiation specimen is released by the installation apparatus. Consequently, the use of this apparatus prevents the irradiation specimen from being dropped into the lower portion of the nuclear reactor thus preventing significant down time in retrieving the irradiation specimen.

I claim as my invention:

1. Apparatus for remotely manipulating irradiation specimens comprising:
   a tubular member having a cap on its lower end and having an opening therein near its lower end;
   a central rod slidable disposed in said tubular member;
   a plurality of pivotable grippers attached to said cap and arranged to contact said central rod for gripping an irradiation specimen when said central rod is moved within said tubular member;
   a camera disposed in said tubular member near said opening for remotely viewing said irradiation specimen; and
   a diverting mechanism attached to said central rod and arranged near said opening for causing said camera to slide out of said tubular member and into a configuration for viewing said irradiation specimen as said irradiation specimen is being held by said grippers.

2. The apparatus according to claim 1 wherein said apparatus further comprises a thin member disposed in said tubular member and attached to said central rod and said diverting mechanism for allowing said camera to be disposed is said tubular member near said diverting mechanism.

3. The apparatus according to claim 2 wherein said apparatus further comprises travel limiting means attached to said diverting mechanism and extending through a slot in said tubular member for limiting the travel of said diverting mechanism said central rod relative to said tubular member.

4. The apparatus according to claim 3 wherein said apparatus further comprises a locking mechanism attached to said tubular member for maintaining said central rod at specific locations relative to said tubular member.

5. The apparatus according to claim 4 wherein said apparatus further comprises a block attached to the lower end of said central rod for contacting said grippers and causing said grippers to pivot relative to said cap.

* * * * *